No. 881,387. PATENTED MAR. 10, 1908.
A. C. EASTWOOD.
SYSTEM OF CONTROL FOR ELECTRIC MOTORS.
APPLICATION FILED MAR. 6, 1907.
4 SHEETS—SHEET 1.
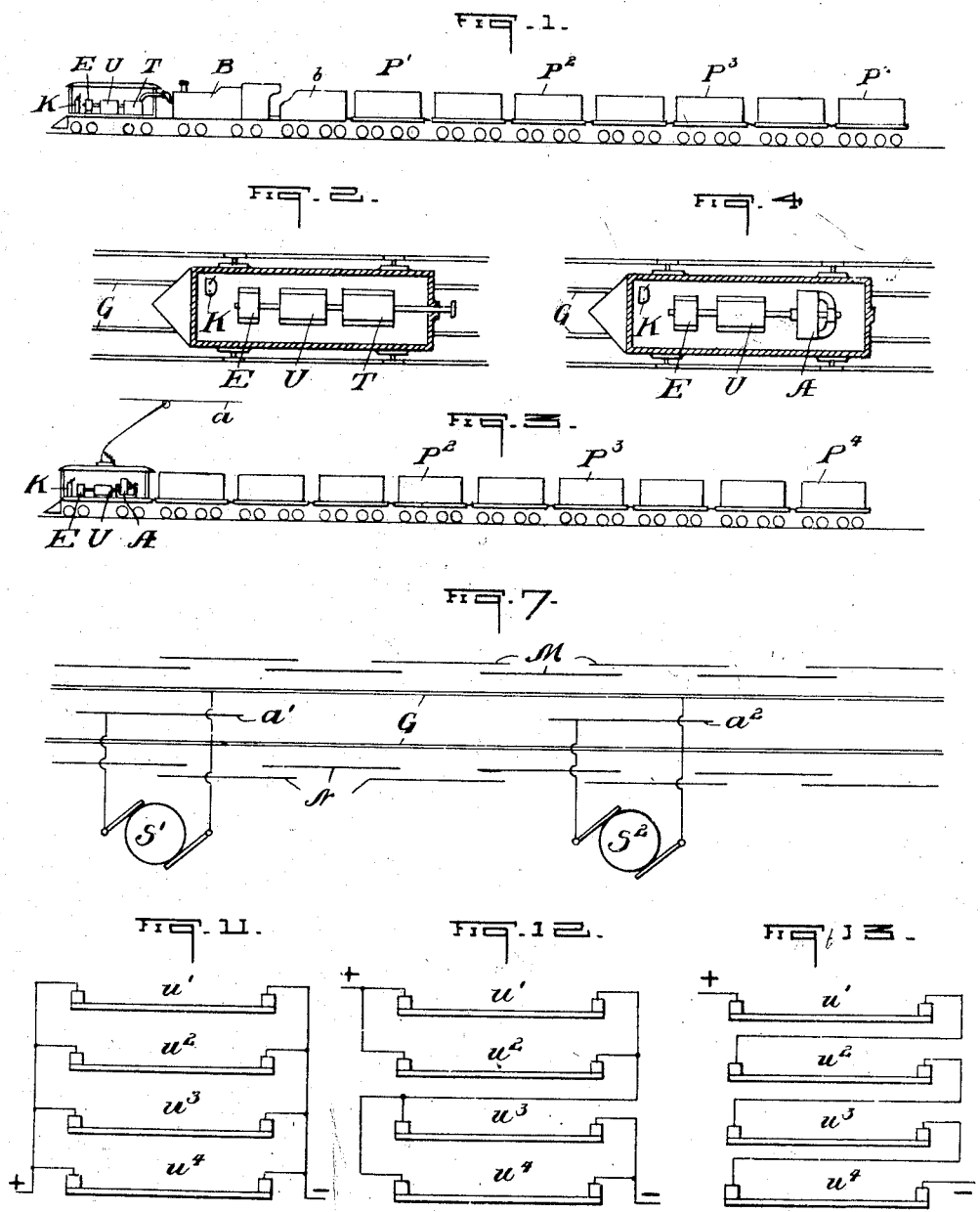

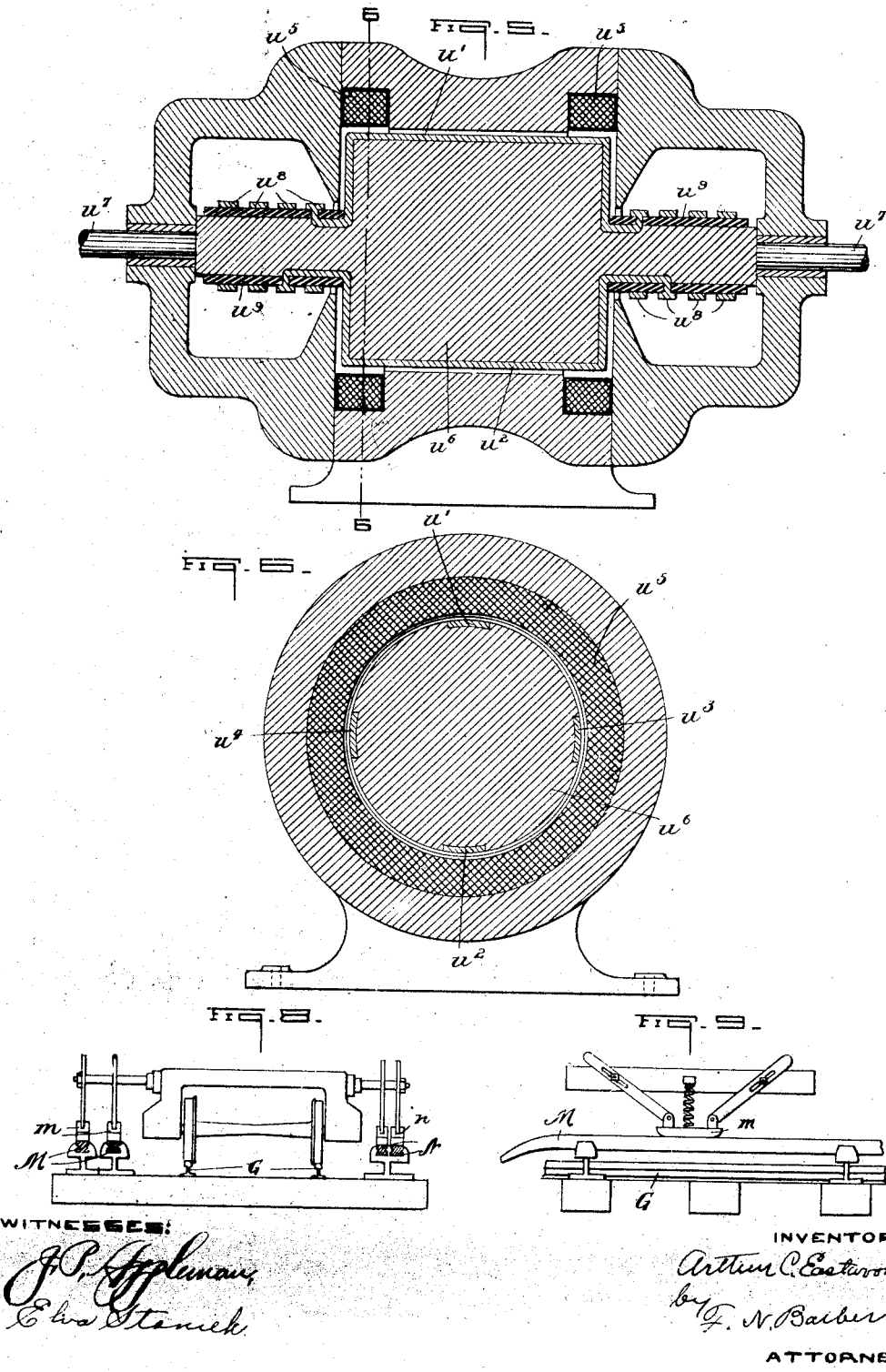

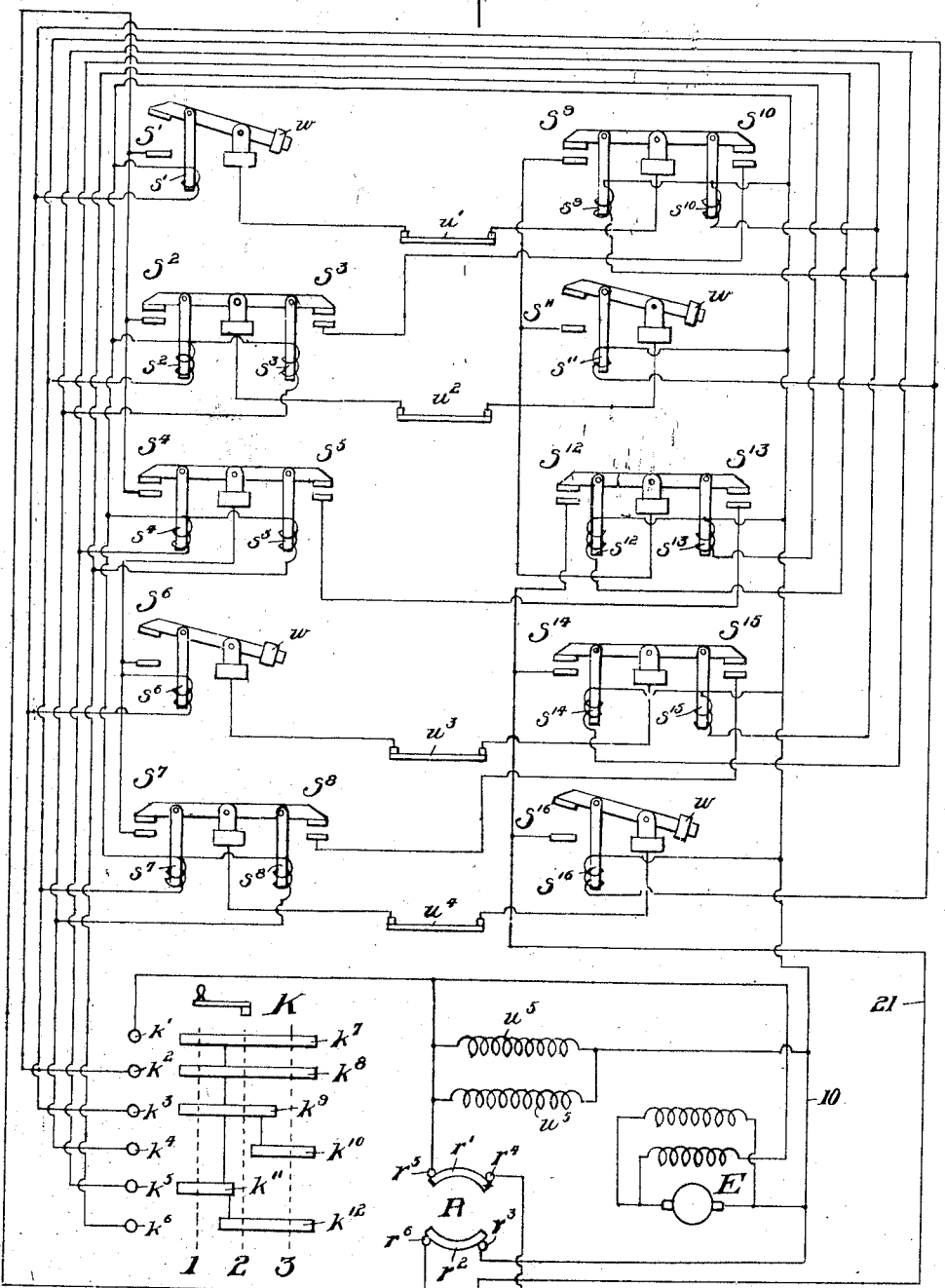

No. 881,387.  
A. C. EASTWOOD.  
SYSTEM OF CONTROL FOR ELECTRIC MOTORS  
APPLICATION FILED MAR. 6, 1907.  
PATENTED MAR. 10, 1908.  
4 SHEETS—SHEET 4.
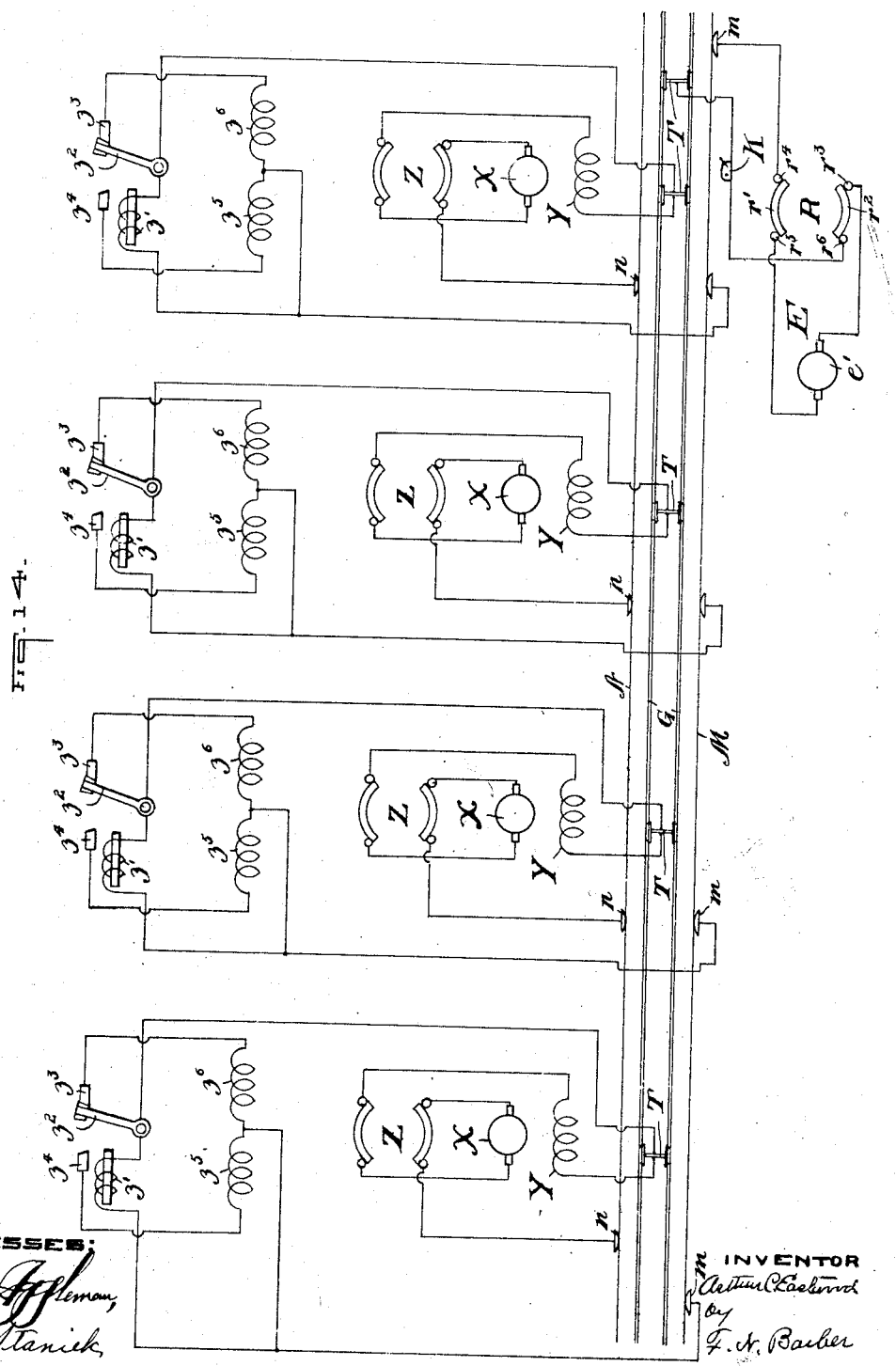
WITNESSES:  
INVENTOR  
Arthur C. Eastwood  
by F. N. Barber  
ATTORNEY

UNITED STATES PATENT OFFICE.

ARTHUR C. EASTWOOD, OF CLEVELAND, OHIO.

SYSTEM OF CONTROL FOR ELECTRIC MOTORS.

No. 881,387.    Specification of Letters Patent.    Patented March 10, 1908.

Application filed March 6, 1907. Serial No. 360,925.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Systems of Control for Electric Motors, of which the following is a specification.

My invention relates to new and useful improvements in electric railways, being particularly applicable to railways constructed and operated in accordance with my pending application for United States Patent, Serial No. 340,469.

The object of the present invention is to render it possible to use direct current at a relatively low voltage for supplying the several motors driving a train, at the same time securing reliable and highly efficient control of the voltage applied to the motors whereby the speed of the motors may be varied to meet operating conditions and the motors may be started under a voltage so low that wasteful starting resistances in series with the motors will be unnecessary.

My invention also provides means whereby, when a heavy current at low voltage is required (as in starting the motors), the current-carrying capacity of the generator supplying the current will be correspondingly increased.

In this application I have illustrated my improved system of control applied to the control of the several motors propelling a train, current being distributed to the motors after the manner described in my pending application for United States Patent, Serial No. 355,396. It will be evident, however, that the general system herein described is equally applicable to the control of a stationary motor or motors.

In carrying out my invention, I make use of a generator of the generic type usually known as a "unipolar" generator, in which a uniform inducing magnetic field is provided. I arrange the generator with a plurality of conductors carried by the rotating member and I vary the voltage applied to the motors by varying the grouping of these conductors, connecting them in multiple for minimum voltage and in series for maximum voltage.

My invention also includes means for effecting the alterations in the grouping of the generator conductors such that the change from one grouping to another will be effected instantaneously and will be independent of the speed at which the operating switch or controller is actuated by the motorman.

My invention also offers means for operating a given railway system at a maximum efficiency and minimum cost. On sections of the railway contiguous to a water-power or a coal mine, where power can be produced very cheaply, instead of providing a power plant traveling with the train and directly supplying power for driving a prime mover, I supply stationary power plants at the points where power can be cheaply produced. This power I preferably generate and distribute as single phase alternating current which may readily be generated and distributed at high voltage with small loss. In such cases, instead of driving the unipolar generator, which supplies power to the motors on the train, with a steam turbine or other direct prime mover, I drive this generator with an alternating current motor supplied with current preferably through an overhead trolley system supplied with current from the stationary power plant. In either case, that is to say, whether power is generated directly by a power plant traveling with the train or whether power is generated at a stationary power plant, duplicate unipolar generators will be used and power will be distributed to the driving motors at similar voltages and in a similar manner so that the same motor and train control equipments may be used on all sections of the railway and at the same time, the characteristics of the various sections of the railway with relation to the cheapest generation of power may be made use of in the most economical manner.

Referring to the accompanying drawings, Figure 1 is a side elevation of a train equipped in accordance with my invention, power being generated by a power plant traveling with the train; Fig. 2, a plan view, partly in section, of the power generating plant shown in Fig. 1; Fig. 3, a side elevation corresponding to Fig. 2, but wherein the unipolar generator is driven by an alternating current motor; Fig. 4, a plan view partly in section of the traveling power plant shown in Fig. 3; Fig. 5, a longitudinal section of one form of unipolar generator which I may employ; Fig. 6, a vertical cross section of Fig. 5 on the line 6—6; Fig. 7, a plan view of a portion of a railway equipped in accordance with my invention and showing the stationary sectional power distributing conductors, control conductors and overhead trolley wires on certain sections energized by stationary power plants; Fig. 8, an end elevation of one of the trucks of a motor-driven car showing the location and arrangement of the contact shoes coöperating with the power distributing conductor and the control conductor, this figure showing also in section the power and control conductors; Fig. 9, a side elevation of one of the trucks showing the arrangement of one of the contact shoes. Fig. 10 is a diagram of electrical connections of the unipolar generator with the associated controlling connections; Figs. 11, 12, and 13, diagrams showing the grouping of the inductors of the unipolar generator corresponding to the three positions of the controller in Fig. 10; and Fig. 14, a diagram of electrical connections of the reversing switches on the various motor driven cars of a train.

Referring to Fig. 1, which is a diagrammatical elevation of a train of cars, I provide a steam boiler B, which is supplied with fuel and water from the tender $b$. Steam is supplied from the boiler B to a steam turbine T, which drives a unipolar generator U. The field winding of the generator is excited by a direct current exciter E. K is a controller by means of which the speed, power and direction of motion of the various motors on the train are controlled, as will be later explained. $P^1$, $P^2$, $P^3$, and $P^4$ represent motor-driven cars in the make-up of the train, other motorless cars being placed between the motor driven cars. It is to be noted that, while I have preferred a steam boiler B and steam turbine T, other forms of prime movers, as for instance, a gas turbine might be used instead, the fundamental idea being that power is generated from fuel consumed by a power plant traveling with the train.

In Fig. 3 which shows a diagrammatical view of a train of cars, I use a unipolar generator U driven by a single phase motor A, to which current is supplied from the trolley wire $a$, this construction being made use of, as previously explained, at points along the railway where power may be economically produced and transmitted in the form of alternating current.

In Figs. 5 and 6, $u^5$, $u^5$ are annular magnetizing windings, which furnish the required magnetizing force. $u^6$ is the rotating member which in this case is indicated (as will be more clearly seen in Fig. 6) as equipped with four inductors, $u^1$, $u^2$, $u^3$, $u^4$. The ends of each of these inductors are connected to contact rings $u^8$, carried upon suitable insulating sleeves $u^9$ surrounding the shaft $u^7$ at either end of the machine. This unipolar generator supplies current to the motors on the motor driven cars $P^1$, $P^2$, $P^3$, etc. through the rails of the railway and the stationary power conductor N, Fig. 7. To vary the speed of the motors, the inductors carried by the rotating member of the generator are grouped in different relations as shown in Figs. 11, 12, and 13.

In Fig. 11, the four inductors $u^1$, $u^2$, $u^3$, $u^4$ are shown as connected in parallel. With this connection the voltage delivered to the motors will be that generated by one inductor and the current carrying capacity of the generator will be correspondingly increased, since its windings are in parallel.

In Fig. 12, inductors $u^1$, $u^2$ are connected in parallel and in series with inductors $u^3$, $u^4$ which are also connected in parallel. This gives double the voltage of the combination in Fig. 11, with one half the carrying capacity.

In Fig. 13, all of the inductors are in series, which gives double the voltage of Fig. 12, with half the carrying capacity thereof. While I have shown only four inductors carried by the rotating member of the generator, of course, this number may be altered as desired without in any way departing from the spirit of my invention. The grouping of the inductors, and hence the voltage applied to the driving motors, is controlled by a controller, the connections of which are shown in Fig. 10. In this figure, $u^1$, $u^2$, $u^3$, $u^4$ represent the inductors of the generator as before. The grouping of these inductors is controlled by magnetically operated switches $S^1$, $S^2$, $S^3$–$S^{16}$, each of these switches being actuated by its own magnetizing winding $s^1$, $s^2$, $s^3$ etc. A number of the switches, for instance, $S^2$, $S^3$ are yoked together, the switch arm being continuous and pivoted at its middle point in such a manner, that, for instance, when switch $S^2$ is closed, switch $S^3$ cannot close and vice versa. Current for actuating the switches is derived from the exciter E, one terminal of which is connected to the contact finger $k^1$ of the operating controller K; the other terminal being connected through wire 10 to one end each of the switch windings $s^1$ to $s^{16}$. The controller K as indicated is of the drum or cylinder type and is shown in developed form, $k^1$, $k^2$, $k^3$, $k^4$, $k^5$, $k^6$ representing the stationary contact fingers $k^7$, $k^8$–$k^{12}$ representing corresponding contact strips carried by the drum of the controller and coöperating with the contact fingers. All of these strips are in electrical connection with one another.

1, 2, and 3 represent the operating positions of the controller. In position 1, the contact finger $k^1$ is in connection with the strip $k^7$; the finger $k^2$, in contact with the strip $k^8$; the finger $k^3$, in contact with the strip $k^9$; and the finger $k^5$, in contact with the strip $k^{11}$. In this position, the switches $S^1$, $S^2$, $S^4$, $S^6$, $S^7$, $S^9$, $S^{11}$, $S^{12}$, $S^{14}$, and $S^{16}$ are closed. Upon following out the circuit connections it will be seen that the closure of these switches causes the grouping of the inductors shown in Fig. 11, that is to say, all of the inductors are in parallel. One end of the parallel group is connected through the wire 20 and the contact shoe $n$ with the stationary power conductor N. The other end of the group is connected through the wire 21 and the truck of the car to the rails G. Since each of the motor-driven cars is provided with contact shoes $n$, coöperating with the power conductor N, current is supplied to the motors through this contact shoe and the trucks of the respective cars.

The motor circuit for position 1 is as follows: from the power conductor N through the shoe $n$, and the wire 20, the contacts of the switch $S^1$, the inductor $u^1$, the contacts of the switch $S^9$, the contacts of the switch $S^{12}$, the wire 21, the trucks of the car, and the rails G back to the power conductor N. A second branch from the wire 20 leads through the contacts of the switch $S^2$, the inductor $u^2$, and the contacts of the switch $S^{11}$ to the wire leading from the contacts of the switch $S^9$, in which wire the currents of the two described branches from the wire 20 combine. A third branch from the wire 20 leads below the switch $S^4$ through the contacts of the switch $S^6$, the inductor $u^3$ and the contacts of the switch $S^{14}$ to the wire 21 which also carries the current from the two inductors $u^1$ and $u^2$. A fourth branch from the wire 20 leads through the contacts of the switch $S^7$, the inductor $u^4$ and the contacts of the switch $S^{16}$ to the common return wire 21.

In passing from position 1 to position 2 of the controller K, it is to be noted that the contact finger $k^5$ loses contact with the strip $k^{11}$ and the finger $k^6$ makes contact with the strip $k^{12}$. It will be seen also that the contact strips $k^{11}$, $k^{12}$ overlap so that the switch magnets connected to the contact finger $k^6$ are excited before the switch magnets connected to the contact finger $k^5$ are deënergized. This is for the purpose of securing instantaneous action of the switches, as may be seen as follows: Referring to the switches $S^4$ and $S^5$, when in position 1 of the controller K, the switch $S^4$ is closed, since its coil $s^4$ is excited through the contact finger $k^5$ coöperating with the strip $k^{11}$. As the controller is rotated toward position 2, the contact strip $k^{12}$ comes into contact with the finger $k^6$ before the strip $k^{11}$ leaves contact with the finger $k^5$. The coil $s^5$ of the switch $S^5$ is therefore excited and the switch $S^5$ tends to close prior to the opening of the circuit of the coil $s^4$. The switch $S^5$, however, is prevented from closing by virtue of the fact that the switch $S^4$ is closed, and, therefore, has a very small air-gap in the magnetic circuit of its closing magnet, while the closing magnet of the switch $S^5$ has a maximum air-gap. The instant, however, that the strip $k^{11}$ opens circuit with the finger $k^5$, the switch $S^5$ instantly closes. This is true of all of the other double acting switches having their respective windings connected to the contact fingers $k^5$, $k^6$.

In position 2 of the controller K, the following switches are closed, namely, $S^1$, $S^2$, $S^5$, $S^6$, $S^7$, $S^9$, $S^{11}$, $S^{13}$, $S^{14}$, and $S^{16}$. This gives the grouping of the generator inductors shown in Fig. 12, that is to say, inductors $u^1$, $u^2$ are in parallel and the pair are in series with inductors $u^3$, $u^4$, which are also in parallel. In passing from position 2 to position 3 of the controller K, it will be seen that the strips $k^9$, $k^{10}$ also overlap, so that instantaneous changes in circuit connections will be secured in passing from position 2 to 3 as above described. In position 3, the following switches are closed: $S^1$, $S^3$, $S^5$, $S^6$, $S^8$, $S^{10}$, $S^{11}$, $S^{13}$, $S^{15}$ and $S^{16}$. This gives the grouping of inductors shown in Fig. 13, namely, the four inductors, $u^1$, $u^2$, $u^3$, $u^4$ are all in series, thus supplying the driving motors on the train with maximum voltage through the stationary power conductor N and the rails G.

When the controller K is operated from position 3 toward the off-position, the circuit changes between steps take place in the inverse order instantaneously as before. When the off-position is reached, the single acting switches $S^1$, $S^6$, $S^{11}$ and $S^{16}$ open by virtue of the weights $w$ with which the switch arms are provided, thereby opening the circuit and preventing a further supply of current through the power conductor N and the rails G. For controlling the direction of rotation of the motors on the various motor-driven cars $P^1$, $P^2$, $P^3$, $P^4$, I have provided, on each car, a magnetically operated reverse switch Z, which is operated in one direction or the other by electromagnets $z^5$, $z^6$. The circuits of these magnets are controlled by a polarized relay having an electro-magnet $z^1$ acting upon a polarized armature $z^2$, which is provided with contacts coöperating with stationary contacts $z^3$, $z^4$. When current flows through the electro-magnet $z^1$ in one direction, the armature $z^2$ is repelled into contact with the contact $z^3$. When current flows through the winding in the reverse direction, the armature $z^2$ is attracted into contact with the terminal $z^4$. The operating solenoid $z^5$ is controlled by the contact $z^4$ and the operating solenoid $z^6$ is controlled by the contact $z^3$. To cause actuation of the reversing switches on each of the motor-driven cars, it is only necessary to reverse the polarity of the control conductor M with reference to the rails G, since the position of the armature $z^2$ of the polarized relay depends upon the direction of the flow of current through the winding of $z^2$. It will be seen that one end of this winding is connected to a contact shoe $m$, coöperating with the stationary control conductor M, while the other end of the winding is connected through the trucks T of the car to the rails G. This reversal of polarity is effected by means of a reversing switch R, shown in Figs. 10 and 14, which is preferably connected with the controller K in such a manner that the reversing switch cannot be actuated except when the controller K is in the off position.

The reversing switch R comprises a pair of movable contact strips $r^1$, $r^2$, which coöperate with the stationary contact fingers $r^3$, $r^4$, $r^5$, $r^6$. The contact fingers $r^5$, $r^3$ are connected respectively to the terminals of the exciter $e^1$. Contact finger $r^4$ is connected to the control conductor M through the contact shoe $m$ carried by the leading car of the train. Contact finger $r^6$ is connected to the rails G through the trucks of the leading car. With the parts in the position shown, that is, with contact strip $r^1$ bridging the fingers $r^4$, $r^5$ and contact strip $r^2$ bridging the fingers $r^3$, $r^6$, the potential of the control conductor M relative to the rails G will be such as to cause the electro-magnet $z^1$ to repel the armature $z^2$, thus energizing the actuating coil $z^6$ and causing the reversing switch Z to take the position shown.

When the reversing switch R is actuated in order to reverse the direction of motion of the driving motors X, contact strip $r^1$ bridges fingers $r^5$, $r^6$, while the strip $r^2$ bridges the fingers $r^3$, $r^4$. It will be seen that this has the effect of reversing the connections between the armature of the exciter $e^1$ and the control conductor M and the rails G, respectively. This causes current to flow through the winding of the electromagnet $z^1$ in a reverse direction, thus causing it to attract the armature $z^2$ and thereby energize the actuating coil $z^5$. This causes contact strip $z^{11}$ to bridge the contact fingers $z^9$, $z^{11}$ and the contact strip $z^{12}$ to bridge the fingers $z^7$, $z^8$. It will be understood that this reverses the direction of the flow of current through the armature X of the driving motor, while current flows through the field winding Y in the same direction as before, thus reversing the direction of rotation of the armature of the motor in the well-known way.

It is to be noted that I have indicated but one motor on each of the motor driven cars. It is obvious that two or more motors may be operated on the trucks of each car, in the well-known way, as desired, the motors being preferably connected in parallel and speed variation secured by varying the grouping of the inductors of the generator as previously described. It will be readily seen that my invention requires very little electrical equipment on the motor-driven cars beyond the driving motors, there being merely a simple form of reversing switch with its associated polarized relay on each of these cars. Further there need be no electrical connections or electrical apparatus on any of the cars intermediate those equipped with driving motors, since current is conveyed to the driving motors through the rails of the railway and the stationary power conductor N, while the requisite connection for operating the reversing switches is effected through the stationary control conductor M and the rails of the railway. With this construction, standard railway cars of any road may be placed between the motor-driven units in the train on a road operated in accordance with my invention.

In Fig. 7, I have indicated diagrammatically a railway in which electric power may be generated with exceptional economy at certain points along the line. In this figure, G are the rails of the railway, N is the sectional stationary power conductor, and M is the stationary sectional control conductor. $a^1$, $a^2$ are sections of a trolley wire fed by the stationary electric generators $S^1$, $S^2$, which are located at points which offer exceptional opportunity for the economic production of power. In such a road the sections or divisions supplied with a trolley wire and fed by the stationary power plant will be operated in accordance with Fig. 3, in which the unipolar generator U will be driven, preferably, by a single phase high speed motor A, supplied with power through the trolley wire $a$ and the rails of the railway. The other sections or divisions of the railway will be operated with power units such as that indicated in Fig. 1, the power being primarily generated by a plant traveling with the train. Preferably the unipolar generator U will be the same in either case as will also the operating controller K, the magnetically operated controller governed thereby, and the driving motors with the associated reversing mechanism on each of the motor-driven cars.

I claim—

1. In an electric railway system, the combination of a train of cars, an electric generator, means for driving the same on said train, electric driving motors on certain of the cars of said train said train having a motorless car or cars between consecutive motor cars, and means for controlling the voltage delivered by said generator to said driving motors and for controlling the direction of rotation of said motors from a given point on said train, said means being independent of the cars on said train not equipped with electric driving motors.

2. In an electric railway system, the combination of a train of cars, an electric generator, means for driving the same on said train, electric driving motors on certain of the cars of said train, a stationary power-conductor along said railway through which and the rails of said railway said generator may deliver a variable voltage to said driving motors, and means on the train for varying the voltage delivered by said generator.

3. In an electric railway system, the combination of a train of cars, an electric generator, means for driving the same on said train, electric driving motors on certain of the cars of said train, a stationary power conductor along said railway through which and the rails of said railway said generator may deliver a variable voltage to said driving motors, means on the train for varying the voltage delivered by said generator, a stationary control-conductor along said railway, electrically operated reversing mechanism on the cars of said train equipped with driving motors, and means including an electric circuit through said stationary control-conductor and the rails of said railway for operating all of said reversing mechanism from a single point on said train.

4. In a distributing system for electric motors, the combination of a unipolar generator having a plurality of inductors, power actuated switches for altering the grouping of said inductors, and a controller for governing the action of said power actuated switches, the arrangement being such that each change in the grouping of said inductors is accomplished in a period of time independent of the speed at which said controller is operated.

5. In a distributing system for electric motors, a unipolar generator having a plurality of inductors, power actuated switches for altering the grouping of said inductors, means for energizing the closing mechanism of one of said switches prior to deënergizing the closing mechanism of another said switches, and means for preventing the closure of said first switch while said second switch is closed.

6. In an electric railway system, a train of cars, driving motors on certain of said cars, a stationary power conductor along said railway, a unipolar generator having a plurality of inductors and traveling along said railway, and means for altering the grouping of said inductors between the said stationary power conductor and the rails of said railway.

7. In an electric railway system, the combination of a train of cars, driving motors on certain of said cars, a stationary power conductor along said railway, a unipolar generator having a plurality of inductors and traveling along said railway and adapted to supply current to said motors through said stationary power conductor and the rails of said railway, and means for altering at will the grouping of said inductors.

8. In an electric railway system, a train of cars, driving motors on certain of said cars, a stationary power conductor along said railway for supplying said motors with current, and means on the train for varying the difference of potential between said power conductor and the rails of said railway.

9. In an electric railway system, a stationary power conductor, a train of cars, driving motors on certain of the cars on said train, a unipolar generator having a plurality of inductors and adapted to supply current to said driving motors through said stationary power conductor and the rails of said railway, and means on the train for controlling the grouping of the inductors of said generator.

10. In an electric railway system, a plurality of motor driven cars distributed through the length of a train, means whereby motors of said cars may be supplied with power and controlled from a common point on the train, said means being independent of the cars not equipped with driving motors, and means whereby power may be generated on the train in the form of direct current or may be supplied to the train from a stationary power plant in the form of alternating current, the same or duplicate driving motors and controlling apparatus being used in either case.

11. In an electric railway system, two forms of power units, one form comprising a power generating plant driving a unipolar generator and adapted to travel with a train, the driving motors on said train being supplied with power from said generator, the second form of power unit comprising an alternating current motor driving an unipolar generator, said motor being supplied with current from a stationary power plant, said unipolar generator and said driving motor being adapted to travel with said train, the driving motors on said train being supplied with power from said unipolar generator, the unipolar generator in either case being provided with a plurality of inductors, and means for altering the grouping of said inductors so that the same or duplicate driving motors and controllers may be employed in either case.

Signed at Cleveland, Ohio, this 2nd day of March 1907.

ARTHUR C. EASTWOOD.

Witnesses:
C. PIRTLE,
J. H. HALL.